United States Patent
Fuchs et al.

(10) Patent No.: US 10,156,242 B2
(45) Date of Patent: Dec. 18, 2018

(54) GAS TURBINE AND METHOD FOR ITS OPERATION

(75) Inventors: Herbert Fuchs, Nussbaumen (CH); Anton Nemet, Lengnan (CH); Jürgen Hoffmann, Untersiggenthal (CH)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 313 days.

(21) Appl. No.: 13/031,918

(22) Filed: Feb. 22, 2011

(65) Prior Publication Data

US 2011/0197593 A1    Aug. 18, 2011

Related U.S. Application Data

(63) Continuation of application No. PCT/EP2009/060577, filed on Aug. 14, 2009.

(30) Foreign Application Priority Data

Aug. 21, 2008   (CH) .................................. 01332/08

(51) Int. Cl.
| F02C 1/00 | (2006.01) |
| F04D 27/02 | (2006.01) |
| F01D 15/10 | (2006.01) |
| F02C 9/22 | (2006.01) |

(52) U.S. Cl.
CPC ......... F04D 27/0246 (2013.01); F01D 15/10 (2013.01); F02C 9/22 (2013.01); F05D 2270/061 (2013.01)

(58) Field of Classification Search
CPC ................. F23R 3/26; F02C 9/18; F02C 9/20
USPC ................. 60/772, 773, 776, 785, 794, 795
See application file for complete search history.

(56) References Cited

U.S. PATENT DOCUMENTS

| 4,072,006 | A | * | 2/1978 | Inubushi et al. | 60/39.25 |
| 5,042,245 | A |   | 8/1991 | Zickwolf, Jr. | |
| 6,226,974 | B1 | * | 5/2001 | Andrew et al. | 60/772 |
| 6,230,479 | B1 | * | 5/2001 | Kawamura et al. | 60/773 |
| 6,308,512 | B1 | * | 10/2001 | Kopko | 60/773 |
| 6,442,942 | B1 | * | 9/2002 | Kopko | 60/773 |
| 6,735,955 | B2 | * | 5/2004 | Mannarino | 60/794 |

(Continued)

FOREIGN PATENT DOCUMENTS

EP    1840355 A1    10/2007

OTHER PUBLICATIONS

Bobok, E., Fluid Mechanics for Petroleum Engineers, 1993, Elsevier Science Publishers, Amsterdam, p. 92.*

(Continued)

*Primary Examiner* — Gerald L Sung
(74) *Attorney, Agent, or Firm* — Buchanan Ingersoll & Rooney PC

(57) ABSTRACT

A gas turbine and method are disclosed by which the gas turbine can be safely operated at nominal speed with reduced margin to a surge limit of a compressor. The gas turbine, via a directly driven generator which generates alternating current with an operating frequency and which is connected in a frequency-coupled manner to an electricity grid, can deliver electric power to this grid. In the case of an underfrequency event the compressor of the gas turbine is unloaded by controlled, fast closing of the variable compressor guide vanes (VGV) and as a result maintains a sufficient margin to the surge limit of the compressor.

13 Claims, 3 Drawing Sheets

(56) References Cited

U.S. PATENT DOCUMENTS

| | | | |
|---|---|---|---|
| 6,794,766 B2* | 9/2004 | Wickert et al. | 290/52 |
| 6,837,055 B2* | 1/2005 | Rowe et al. | 60/773 |
| 7,269,953 B2* | 9/2007 | Gadde et al. | 60/773 |
| 7,274,111 B2* | 9/2007 | Andrew et al. | 290/52 |
| 7,367,193 B1* | 5/2008 | Thompson | 60/773 |
| 7,608,938 B2* | 10/2009 | Andrew et al. | 290/52 |
| 2003/0011199 A1* | 1/2003 | Wickert | F01D 15/10 290/52 |
| 2003/0192316 A1* | 10/2003 | Rowe et al. | 60/773 |
| 2004/0172950 A1* | 9/2004 | Venkataramani et al. | 60/776 |
| 2004/0187473 A1* | 9/2004 | Rowe | 60/39.281 |
| 2005/0109033 A1* | 5/2005 | Braun et al. | 60/772 |
| 2006/0010876 A1* | 1/2006 | Hoffmann et al. | 60/773 |
| 2006/0101826 A1* | 5/2006 | Martis et al. | 60/794 |
| 2007/0271929 A1* | 11/2007 | Berry | F01D 17/105 60/782 |
| 2009/0071165 A1* | 3/2009 | Matz | F01D 5/10 60/772 |
| 2010/0281875 A1* | 11/2010 | Price et al. | 60/772 |

OTHER PUBLICATIONS

International Search Report (PCT/ISA/210) dated Mar. 4, 2010, by European Patent Office as the International Searching Authority for International Application No. PCT/EP2009/060577.
Swiss Search Report dated Jan. 15, 2009, by European Patent Office as the International Searching Authority for Swiss Application No. CH 13322008.

* cited by examiner

GAS TURBINE AND METHOD FOR ITS OPERATION

RELATED APPLICATION

This application claims priority as a continuation application under 35 U.S.C. § 120 to PCT/EP2009/060577, which was filed as an International Application on Aug. 14, 2009 designating the U.S., and which claims priority to Swiss Application 01332/08 filed in Switzerland on Aug. 21, 2008. The entire contents of these applications are hereby incorporated by reference in their entireties.

FIELD

The present invention relates to the field of gas turbine technology, such as a gas turbine with fast controllable variable compressor guide vanes, and also to a method for operating such a gas turbine. For example, a method is disclosed for operating a gas turbine when ambient conditions deviate from design conditions and in the case of underfrequency of the electricity grid to which it delivers the electric power.

BACKGROUND INFORMATION

Gas turbines, in the case of which a power-generating generator is driven by a gas turbine and the generated electric power is fed to a grid with a predetermined grid frequency (for example 50 or 60 Hz), can have a fixed connection between the (mechanical) speed of the turbine and the grid frequency. The power output of the generator in this case is connected in a frequency-locked manner to the grid via a grid connection, while it is driven in a speed-coupled manner by the turbine either directly (1-shaft arrangement) or via a mechanical transmission.

If large consumers are connected to the grid or power plants fall off the grid, fluctuations of the grid frequency can occur, which the gas turbine has to directly follow as a result of the frequency-locked coupling. This can lead to critical operating conditions in the compressor of a gas turbine.

FIG. 1 shows in a greatly simplified view a power plant 10 which can be operated in accordance with exemplary methods as disclosed herein, and which generates power by means of a gas turbine 12 with coupled first generator 18 and a steam turbine 24 with coupled second generator 18, to feed the power to a grid. The gas turbine 12 and the generator 18 are connected by means of a common shaft 19 and form a shaft train 11. The gas turbine in a simple case comprises a compressor 13 with associated variable compressor guide vanes and controller via an air intake 16, inducts and compresses combustion air. The compressor 13 can be assembled from a plurality of series-connected compressor sections which operate on increasing pressure level, and possibly enable intercooling of the compressed air. The combustion air which is compressed in the compressor 13 reaches the combustion chamber 15 into which liquid fuel (for example oil or other suitable fuel) or gaseous fuel (for example, natural gas or other gaseous fuel) is injected via a fuel feed line 17 and, consuming combustion air, is combusted.

The hot gases which issue from the combustion chamber 15 are expanded in a subsequent turbine 14, performing work, and so drive the compressor 13 and the coupled first generator 18. The still relatively hot exhaust gas when discharging from the turbine is transmitted through a subsequent heat recovery steam generator 23 in order to produce steam in a separate water-steam cycle 25 for the operation of a steam turbine 24. Condenser, feed-water pump and further systems of the water-steam cycle 25 are not shown for simplification of the figure. Such a combination of gas turbine and steam power plant is referred to as a combined cycle power plant. The steam turbine 24 in this case can be coupled with the first generator 18 on the side opposite the turbine 14; gas turbine 12, first generator 18 and steam turbine 24 then form a so-called "single-shaft power train". The steam turbine 24, however, as shown in FIG. 1, can also drive a separate second generator 18 on a separate shaft train. Different combinations are known for multi-shaft arrangements.

In the case of the 1-shaft gas turbine of FIG. 1, the speed of the gas turbine 12 can be in a fixed ratio to the frequency, which is generated in the generator 18, of the alternating voltage which is equal to the grid frequency of the grid 21. As a result, the mechanical speed with which the compressor of the gas turbine is operated is also determined.

The frequency range, and therefore also a minimum mechanical speed, in which the gas turbine should be able to operate, as a rule is stipulated by the grid operator. Furthermore, an ambient operating range is defined, depending upon the local circumstances. In order to be able to safely operate within the entire possible frequency range and ambient operating range, the compressor of the gas turbine is designed and operated with a margin to the so-called surge limit.

The surge limit is the state at which the pressure ratio which has to be built up by the compressor for the current operating condition becomes too large, and at which a flow separation, backflow and pressure surges in the compressor can occur.

A stability criterion for the safe operation of a compressor is the so-called "aerodynamic speed". For the respective positioning of variable compressor guide vanes, the maximum pressure ratio which the compressor can build up is created in dependence upon the aerodynamic speed. In order to ensure a safe operation of the gas turbine, this is operated with a margin to the surge limit, which is also referred to as surge limit margin.

If the margin to the surge limit is no longer sufficient for a safe operation of the gas turbine, the compressor should be unloaded. This can be achieved by means of a reduction of the compressor pressure ratio or by closing the variable compressor inlet guide vanes.

These measures lead to a reduction of the power output and in an optimized power plant operation are to be avoided as far as possible. For example, in the case of an underfrequency event on days with high ambient temperature in which the gas turbine power output decreases proportionally to the grid frequency without further countermeasures, a further power output reduction would additionally destabilize the grid.

Furthermore, the gas turbine can be taken off the grid by protective unloading, such as by means for load shedding, and further operated independently of the grid in a speed-governed manner. Since it then delivers no more power to the grid, however, this is an unfavorable solution for grid stability.

The operating of gas turbines with sufficient margin to the surge limit is known. A method for operating a gas turbine, with which the margin to the surge limit at full-load operation is kept as constant as possible for the entire ambient operating range, is described in U.S. Pat. No. 6,226,974.

Furthermore, a method for operating a gas turbine is proposed in U.S. Pat. No. 6,794,766, in which during the quasi-steady-state operation at low aerodynamic speed the variable compressor guide vanes are closed in order to realize a sufficient surge limit margin. The surge limit margin in this case is selected large enough for the variable compressor guide vanes to be able to be opened in the case of an underfrequency event compared with the nominal position at mechanical design speed. As a result, the speed-dependent power output drop of the gas turbine can be at least partially compensated and the grid can be supported better.

A design and operation with large surge limit margin in the case of known gas turbines during normal operation, i.e. during operation at nominal speed in the ambient operating window, leads to a suboptimal compressor efficiency. Moreover, the power output potential of the gas turbine in wide operating ranges cannot be fully utilized.

SUMMARY

A gas turbine is disclosed for driving a generator to generate alternating current with an operating frequency, and for communication in a frequency-coupled manner with a grid having a given grid frequency, the gas turbine comprising: a compressor having variable compressor guide vanes; and a closed-loop controller connected to the variable compressor guide vanes for closing the variable compressor guide vanes with a sufficient speed so that a margin to a surge limit of a compressor is maintained during an underfrequency event of the grid.

A method for operating a gas turbine is disclosed having a compressor having variable compressor guide vanes and a closed-loop controller connected to the variable compressor guide vanes, the method comprising: determining a dynamic limit of a permissible mechanical speed ($n_{mech}$) in dependence upon ambient conditions; and when the mechanical speed falls below this limit, operating the variable compressor guide vanes at a VGV underfrequency position ($VGV_U$), wherein a margin to a surge limit of the compressor is maintained.

BRIEF DESCRIPTION OF THE DRAWINGS

The invention is subsequently to be explained in more detail based on exemplary embodiments in conjunction with the drawings. In the drawings.

DETAILED DESCRIPTION

Figure 1:
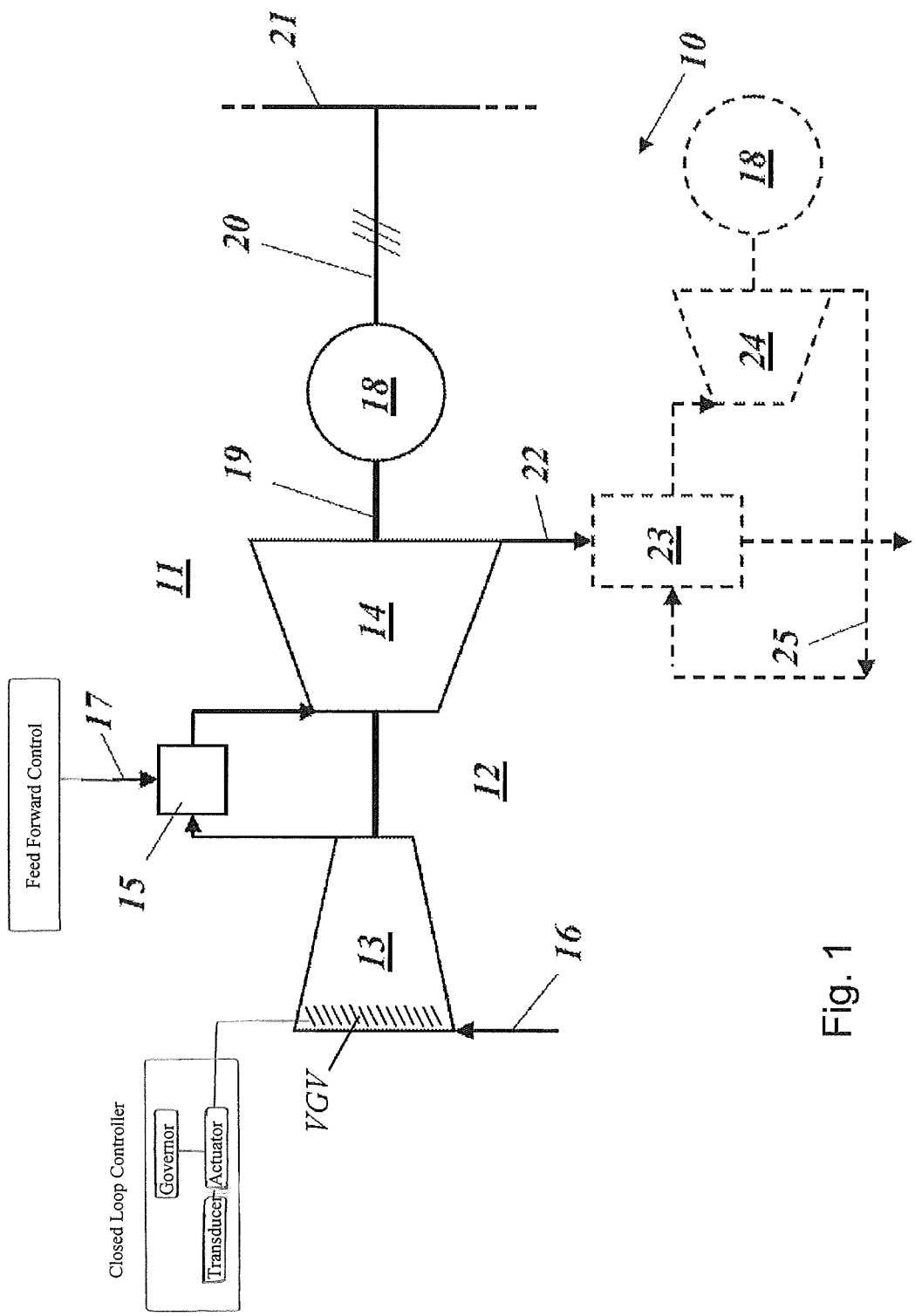
FIG. 1 shows a greatly simplified schematic diagram of an exemplary known combined cycle power plant with a gas turbine and a downstream water-steam cycle that is operated in accordance with exemplary embodiments disclosed herein.

A gas turbine such as that of FIG. 1 is disclosed for supplying electricity grids which, with high efficiency, can utilize the power output potential of the gas turbine in a wide operating window.

Exemplary embodiments include a control system and an associated method for closed-loop controlling of the variable compressor guide vanes (VGV), which even in the case of serious underfrequency events in conjunction with unfavorable ambient conditions adjusts the variable compressor guide vanes with such speed that the influence of the grid-frequency changes can be compensated in the specified operating range by unloading the compressor. For this purpose, during an underfrequency event the variable compressor guide vanes are closed with such speed that a margin to the surge limit of the compressor is maintained.

As ambient conditions, the inlet conditions of the compressor are referred to in this case. These as a rule are equal to the environmental conditions of the power plant. As a result of special measures, such as cooling of the inlet air for power increase or recirculation of exhaust gas, these can deviate from the environmental conditions.

Figure 2:
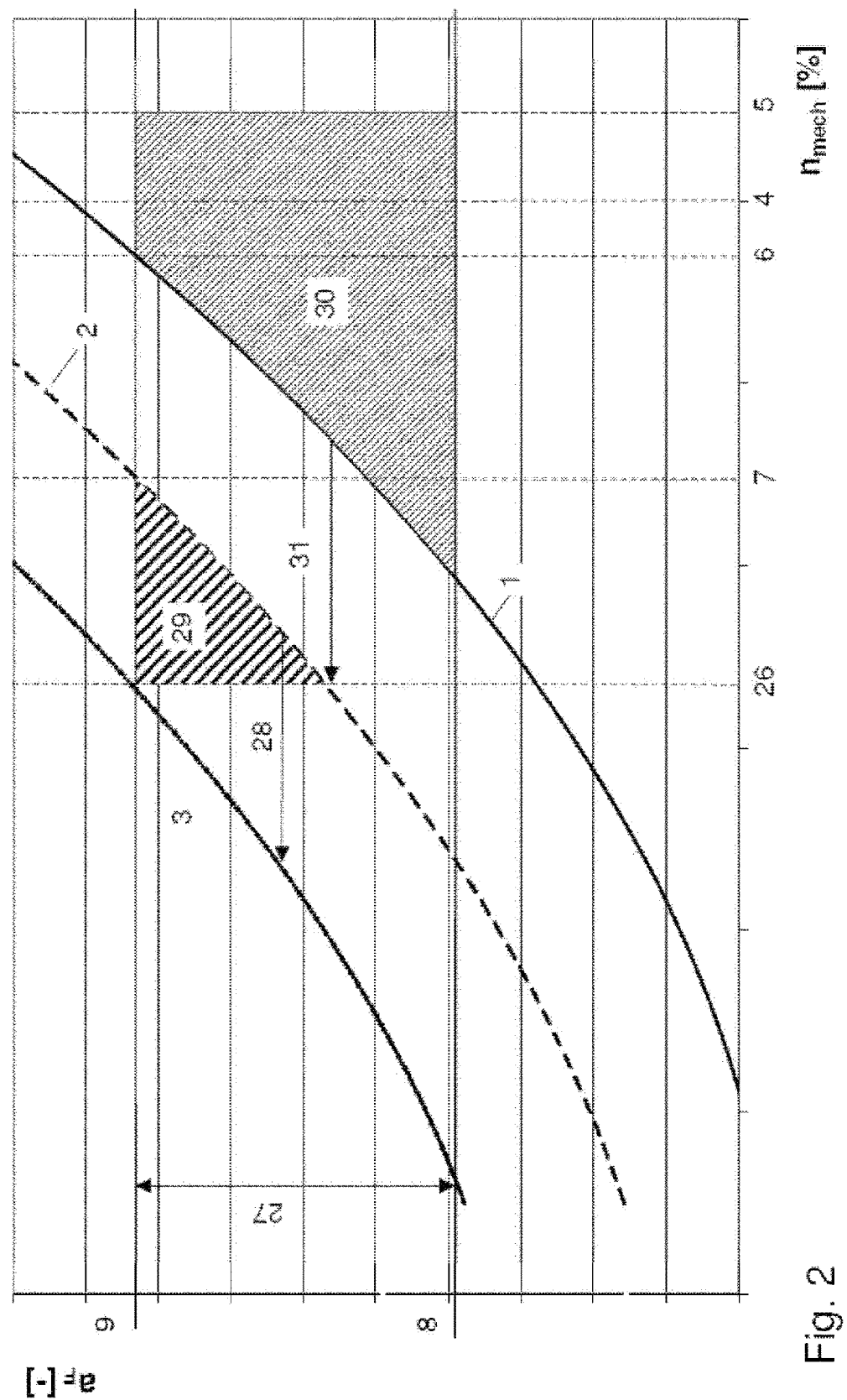
FIG. 2 shows a simplified view of an exemplary controller with depicted operating limits in dependence upon the ambient conditions and the mechanical speed.

A control means can be a closed-loop controller as represented generally in FIG. 2. The control means can be configured as control chain designed for quick operation and can contain a governor or computer, actuators of the variable compressor guide vanes, transducers of the angular position of the variable compressor guide vanes, a grid-frequency measurement or gas turbine speed measurement, and also a data transmission.

In order to simplify the closed-loop controlling, the aerodynamic speed:

$$n^* = n_{mech} \frac{1}{\sqrt{\kappa \cdot R \cdot T}}$$

can be split into a term for the mechanical speed $n_{mech}$ and a term which describes the ambient boundary condition. The ambient boundary conditions of the compressor are described by the quotient of one divided by the square root of the product of the isentropic exponent k, gas constant R and inlet temperature T, and summed up in the ambient factor $a_F=1/\sqrt{k \cdot R \cdot T}$. The aerodynamic speed can therefore be written in a simplified manner as $n^*=n_{mech}a_F$.

The ambient conditions, and therefore the ambient factor $a_F$, change slowly and, relative to the fast dynamic processes in a gas turbine, are quasi-stationary. In contrast to this, the mechanical speed $n_{mech}$ changes quickly in the case of an underfrequency event.

The minimum specified mechanical speed, at which a safe operation with the respective position of the variable compressor guide vanes is possible, can be determined in dependence upon the ambient conditions. To this speed is added a margin for a speed drop which is the worst to be expected during the reaction time of the closed-loop controlling of the variable compressor guide vanes, and also for dynamic effects in the gas turbine, and as a result determines a limit of the permissible operating range. This is stored in the governor of the gas turbine or is made available to it via a suitable storage medium. During operation, the relevant ambient conditions are measured and the associated limiting value is determined. As soon as the mechanical speed drops below this limiting value, the variable compressor guide vanes are quickly closed.

Dynamic effects in the gas turbine are time lags in the operating condition during fast transients of the gas turbine. These can lead to values (e.g., specified critical values), such as compressor discharge pressure or temperature, deviating from the stationary values with otherwise the same boundary conditions. For example, the volumes in the turbine during closing of the variable compressor guide vane rows lead to a time lag of the pressure drop at the compressor exit. In addition to the volume of compressor, combustion chamber and turbine, the volumes of the cooling air system are also to be taken into consideration, which can lead to a shift of the pressure build-up in the compressor if, for example, cooling air coolers are arranged.

The limiting value is determined and stored in an exemplary embodiment as a multidimensional field in dependence upon the position of the variable compressor guide vane rows, the compressor inlet temperature T, the isentropic exponent k, and the gas constant R. In practice, the product of isentropic exponent k and gas constant R of the inlet air of air-breathing gas turbines can be determined for example in a simplified manner as a function of the air humidity. Alternatively, changes of the isentropic exponent k can be ignored and the gas constants R can be determined as a function of the air humidity.

In a further exemplary embodiment, the limiting value is defined and stored in a simplified manner as a one-dimensional function of the ambient factor $a_F$.

The portion of the overall surge limit margin which is provided for overcoming underfrequency events, which during full-load operation of conventional gas turbines is provided for safe operation, can be significant. It is, for example, at least 10%, as a rule even more than 30% and when ignoring the margins for design uncertainties and aging of the gas turbine is even 50% or more of the overall surge limit margin. With the proposed fast closed-loop controlling and the control concept which is associated with it, this portion can be dispensed with and so the compressor can be operated closer to the efficiency optimum and the power output potential of the gas turbine can be better utilized.

In the event of serious underfrequency events, the grid frequency can drop by more than, for example, 1 Hz/s. In an exemplary extreme, even by 1.6 Hz/s can be considered, as observed in the case of serious frequency interruptions on account of field experience. For designing, even by 2 Hz/s or more can be employed.

The closing speed of the variable compressor guide vanes which is specified for compensation of such a fast frequency interruption is dependent upon the characteristics of the compressor. The closing speed of the variable compressor guide vanes can be specified in angular degree per second. For unloading of the compressor, it is at least, for example, 5°/s in the case of known industrial gas turbines. A safe operation for example can be ensured in most cases with a closing speed of, for example, 10°/s. A closing speed of up to 20°/s and more can be advantageous.

The closed-loop control means in this case will not close the variable compressor guide vanes up to the idling position, but as far as is desired for realizing a safe operation at the minimum frequency which is specified by the grid. This so-called VGV underfrequency position depends upon the gas turbine and the grid specifications (e.g., requirements). Closing of the first variable compressor guide vanes by for example 5° compared with the nominal position can be sufficient. Closing by about 10°, for example, can also be desirable. In an exemplary extreme, the variable compressor guide vanes have to be closed even further. The ratio of angle changes of various rows of the variable compressor guide vanes in this case is compressor-specific. If available, the second, third or subsequent row of variable compressor guide vanes is, for example, operated by a lesser degree than the first row.

For partial load operation of the gas turbine, during which the gas turbine is operated with a position of the variable compressor guide vanes between nominal position and VGV underfrequency position, various control strategies can be in accordance with the present disclosure. In a first embodiment, the limit of the permissible operating range for open compressor guide vanes is applied independently of the current position of the variable compressor guide vanes, as long as the variable compressor guide vanes open further than the VGV underfrequency position. In a second embodiment, the limit of the permissible operating range is additionally determined as a function of the position of the variable compressor guide vanes. This allows, at partial load, the limit at which an underfrequency event is reacted to shift even further to low mechanical speeds. In a further embodiment, the limit of the permissible operating range is furthermore determined as a function of the compressor discharge pressure or of the compressor pressure ratio.

The position of the variable compressor guide vanes, during fast transients, does not necessarily have to be carried out via closed-loop controlling, but can be realized via open-loop controlling. The normal closed-loop controlling is interrupted for this during the fast transients or the open-loop control signal is added to the closed-loop control signal as an offset.

Corresponding to the fast changes in the position of the variable compressor guide vanes, the inlet mass flow of the compressor quickly changes. Without correction of the fuel mass flow, this could lead to a sharp increase of the stoichiometric ratio in the combustion chamber and to a steep rise of the turbine inlet temperature. This rise can be kept within the limits of normal fluctuations so that the gas turbine is not automatically shut down beyond protective limits, and in order to avoid severe damage to the combustion chamber and turbine.

The turbine inlet temperature is, for example, not measured directly but determined indirectly via a combination of measured values. One of the measured values in this case is the relatively slow measuring of the turbine exhaust temperature. As a result of the slow measuring of the turbine exhaust temperature, the determining of the turbine inlet temperature during fast transients is not optimum for the closed-loop controlling. In order to realize an improved transient operation a feed forward control of the fuel control can be provided. With this, the fuel mass flow can be reduced for example proportionally to the inlet mass flow.

In FIG. 2, a controller for the FIG. 1 power plant is depicted wherein possible operating windows are shown. Exemplary critical limits of mechanical speed are shown in dependence upon the ambient conditions which for simplification are summarized in the ambient factor $a_F$. A specified permissible ambient operating range 27 is delimited by the minimum ambient factor 8 and the maximum ambient factor 9.

The mechanical speed, starting from the design speed 4, can vary depending upon the operating concept in an operating range. At the top, the mechanical speed is delimited by the maximum mechanical speed 5. The speed can be delimited at the top by mechanical limits and not by aerodynamic limits. Possibilities for extending the speed range in the direction towards higher speeds, such as an extension of the ambient operating range, are not a focus of the present disclosure, and at this point need not be discussed further.

The exemplary controller can provide a widening of the operating range in the direction towards lower mechanical speeds $n_{mech}$. The known limit of the full-load operation, which is referred to as static limit 1 and can ensure safety against a serious underfrequency event without countermeasures, in the example leads to a relatively small operating window which is referred to as the base operating window

30. By means of a fast closed-loop control and corresponding method as disclosed herein, the speed limit can be shifted towards significantly lower mechanical speeds and a widening of the full-load operating window 31 is realized. Operation with opened variable compressor guide vanes VGV and nominal turbine inlet temperature is referred to as full load in this case.

In the case of the known method, the static limit of the full-load operating range 1 is a hard limit below which full-load operation is not possible. Either the gas turbine is protectively unloaded upon reaching the limit, or it has to be unloaded before reaching the limit in quasi-steady-state operation in order to widen the operating range in good time prior to an underfrequency event. Accordingly, an unlimited operation can be ensured only for small interruptions in the grid frequency. The mechanical speed $n_{mech}$ can be reduced only up to a first speed limit 6 in the overall ambient range.

In contrast to this, the new limit of the full-load operating range, which is referred to as dynamic limit 2, allows a significant widening of the operating range and does not represent a hard limit. According to exemplary embodiments disclosed herein, the gas turbine 12 can be operated up to this dynamic limit 2 with full load. Exceeding the dynamic limit 2 does not lead to a protective unloading but to a fast closing of the variable compressor guide vanes VGV by the control means, and therefore to an additional widening of the operating range as a result of partially closed compressor guide vanes 28.

With the dynamic closed-loop control an unlimited operation for significantly larger interruptions in the grid frequency can be ensured. The mechanical speed $n_{mech}$ can be reduced up to a second speed limit 7 within the overall ambient range.

Within the scope of the ambient operating range 27 and the lower limits of the operating range, as a result of the minimum mechanical speed 26, an additional operating window for partially closed variable compressor guide vanes 29 can be achieved.

Starting from the base operating window 30, therefore, a load operation within the overall specified operating range can be ensured by widening of the full-load operating window 31 and the operating window for partially closed variable compressor guide vanes 29. Limitations in the performance of the gas turbine 12 are accepted in the example only in the small operating window for partially closed variable compressor guide vanes 29.

Customarily, such a large operating window could be realized only by an appreciable design change in the compressor or the gas turbine which would result in a significant loss in efficiency and power output or in a cost increase of the design owing to larger compressor dimensions.

Figure 3:
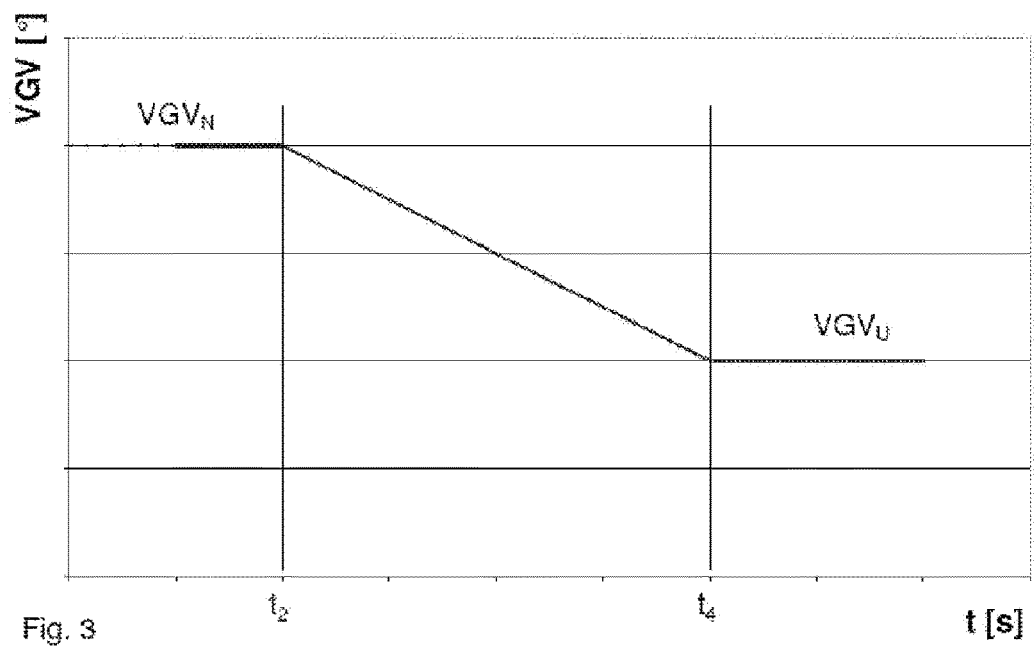
FIG. 3 shows an exemplary time course of a fast VGV closing.

The time course of the fast VGV underfrequency closed-loop controlling is shown in the example of a linear closing in FIG. 3. As soon as the mechanical speed $n_{mech}$ falls below the dynamic limit of the operating range with VGVs open 2, the variable compressor guide vanes are closed from the VGV nominal position $VGV_N$ by the governor. This time point is referred to as the start of the fast VGV underfrequency closed-loop controlling $t_2$. The VGVs are closed for example with constant angular speed up to the VGV underfrequency position $VGV_U$ which they reach at the closing time point of the VGV underfrequency closed-loop controlling $t_4$.

Figure 4:
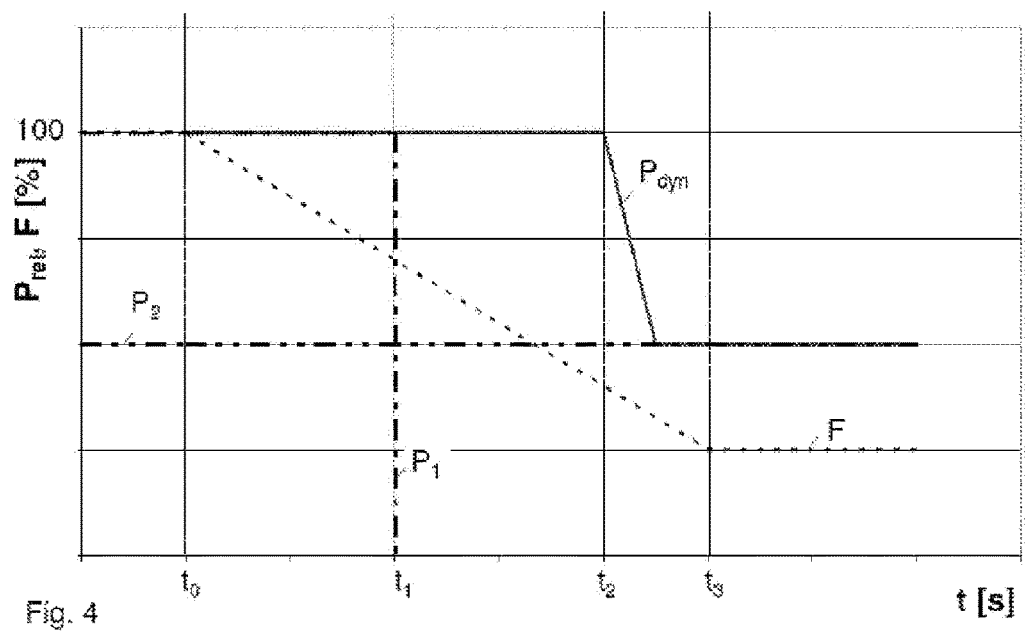
FIG. 4 schematically shows an exemplary time course of the power output for various operating methods and the speed in the case of an underfrequency event.

Exemplary resulting advantages compared with known gas turbines with known operating methods are schematically shown in FIG. 4 based on the time course of the relative power output $P_{rel}$, scaled with the full load, and the grid frequency F for an exemplary underfrequency event. Starting from the mechanical design speed $n_{mech}$=100%, the grid frequency falls from a time point $t_0$ until it reaches a minimum at a time point $t_3$.

In a first example for known gas turbines 12, the gas turbine 12 is operated at full load up to a time point $t_1$ and delivers a power output $P_1$ to the grid. At the time point $t_1$, the mechanical speed $n_{mech}$ falls as a result of the reduced grid frequency F below the speed limit 1 which limits the full-load operating range in dependence upon ambient conditions. After falling below the static limit of the full-load operating range 1, the gas turbine 12 is protectively unloaded and can no longer deliver a power output $P_1$ to the grid.

In a second example for known gas turbines 12, the gas turbine 12, in dependence upon the ambient conditions, is already unloaded during steady-state operation at design speed in order to satisfactorily ensure margin to the surge limit. The gas turbine 12 thus no longer has to be protectively unloaded in the specified operating range but already has a reduced power output $P_2$ during normal operation at design speed.

Exemplary methods as disclosed herein allow the gas turbine 12 to operate until reaching the dynamic limit of the full-load operating range 2 without reduction of the power output $P_{dyn}$. Only if at the time point "start of the fast underfrequency closed-loop controlling" $t_2$ the mechanical speed $n_{mech}$ falls below the dynamic limit of the full-load operating range 2 as a result of the reduced grid frequency F, which is determined in dependence upon the ambient conditions, is the gas turbine unloaded by means for fast closing of the variable compressor guide vanes. It can then, however, also deliver further power output $P_{dyn}$ to the grid.

In the foregoing examples, the direct influence of the mechanical speed upon the power output of the gas turbine is not taken into consideration: it is assumed that this is compensated by means of suitable measures for power increase such as means for increasing the hot gas temperature or for injecting water into the compressor or into the combustion chamber. Only the influence of the position of the variable compressor guide vane rows VGV and also the influence of a protective unloading are schematically shown.

Exemplary embodiments are not limited to the examples which are represented here. Based on the examples, a large number of possibilities, equivalent closed-loop systems and methods present themselves to those skilled in the art to be realized. For example, the fast closing of the variable compressor guide vanes 29 can be carried out independently of the ambient conditions below a mechanical speed $n_{mech}$ or grid frequency F. For example, the fast closing of the variable compressor guide vanes 29 could be carried out below a fixed limiting value. It could be carried out, for example, below 98% of the nominal grid frequency. With this, the closed-loop controlling of the gas turbine would be able to be realized in a simplified manner only as a function of the grid frequency and independently of the ambient conditions.

Furthermore, the application is not limited to air-breathing gas turbines, but is also possible with closed or partially closed cyclic processes with optional gas mixtures, for example for gas turbines with exhaust gas recirculation.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF DESIGNATIONS

1 Static limit of the full-load operating range
2 Dynamic limit of the full-load operating range
3 Limit during underfrequency VGV
4 Mechanical design speed
5 Maximum mechanical speed
6 First speed limit
7 Second speed limit
8 Minimum ambient factor $a_F$
9 Maximum ambient factor $a_F$
10 Power plant
11 Shaft train
12 Gas turbine
13 Compressor
14 Turbine
15 Combustion chamber
16 Air inlet
17 Fuel feed
18 Generator
19 Shaft
20 Grid connection (frequency-coupled)
21 Grid
22 Exhaust gas outlet
23 Heat recovery steam generator
24 Steam turbine
25 Water-steam cycle
26 Minimum mechanical speed
27 Ambient operating range
28 Widening of the operating range as a result of partially closed variable compressor guide vanes
29 Operating window for partially closed variable compressor guide vanes
30 Base operating window
31 Widening of the full-load operating window
$a_F$ Ambient factor
$n_{mech}$ Mechanical speed
VGV Variable compressor guide vanes
$P_1$, $P_2$ Power output characteristic with conventional closed-loop controlling
$P_{dyn}$ Power output characteristic with closed-loop controlling with dynamic limit of the full-load operating range
$P_{rel}$ Relative power output
R Gas constant of the inlet air
T Compressor inlet temperature
$t_0$ Time point: start of the underfrequency event
$t_1$ Time point: falling below the dynamic limit of the full-load operating range 1
$t_2$ Time point: falling below the dynamic limit of the full-load operating range 2
Start of the fast VGV underfrequency closed-loop controlling
$t_3$ Time point: reaching of the minimum grid frequency
$t_4$ Closing time point of the VGV underfrequency closed-loop controlling
$VGV_N$ VGV nominal position
$VGV_U$ VGV underfrequency position
k Isentropic exponent of the inlet air.

What is claimed is:

1. A gas turbine for driving a generator to generate alternating current with an operating frequency, and for communication in a frequency-coupled manner with a grid having a given grid frequency, the gas turbine comprising: a compressor having variable compressor guide vanes, wherein the compressor and turbine are arranged on a single shaft, the shaft configured to be coupled to the generator; and
a closed-loop controller connected to the variable compressor guide vanes for closing the variable compressor guide vanes during an underfrequency event of the grid, as a function of a gas turbine speed, with a speed so that a surge limit margin of a compressor is maintained during the underfrequency event of the grid.

2. The gas turbine as claimed in claim 1, wherein a control speed of the variable compressor guide vanes is more than 5°/s.

3. The gas turbine as claimed in claim 1, wherein a control speed of the variable compressor guide vanes is more than 10°/s.

4. The gas turbine as claimed in claim 1, wherein actuators of the variable compressor guide vanes can be operated faster than 10°/s.

5. The gas turbine as claimed in claim 1, wherein the closed-loop controller of the variable compressor guide vanes has actuators, transducers of angular position of the variable compressor guide vanes, and a governor for a closed-loop controlling with more than 10°/s angular speed.

6. The gas turbine as claimed in claim 3, wherein actuators of the variable compressor guide vanes can be operated faster than 10°/s.

7. The gas turbine as claimed in claim 6, wherein the closed-loop controller of the variable compressor guide vanes includes the actuators, transducers of angular position of the variable compressor guide vanes, and a governor for a closed-loop controlling with more than 10°/s angular speed.

8. A method for operating a gas turbine for driving a generator that is in communication in a frequency coupled manner with a grid, the grid having a given frequency, the generator generating alternating current with an operating frequency, the gas turbine having a compressor having variable compressor guide vanes and a closed-loop controller connected to the variable compressor guide vanes, wherein the compressor and turbine are arranged on a single shaft, the shaft configured to be coupled to the generator the method comprising:
determining a dynamic limit of a permissible mechanical speed ($n_{mech}$) in dependence upon ambient conditions; and
when the mechanical speed falls below this limit, closing the variable compressor guide vanes during an underfrequency event of the grid as a function of a gas turbine speed with a speed so that, a surge limit margin of the compressor is maintained during the underfrequency event of the grid.

9. The method as claimed in claim 8, wherein the dynamic limit of the permissible mechanical speed ($n_{mech}$) is determined in dependence upon the position of the variable compressor guide vanes.

10. The method as claimed in claim 8, wherein the ambient conditions are determined by an ambient factor ($a_F$) calculated as a quotient of one and a square root of a product of an isentropic exponent (k), gas constant (R) and compressor inlet temperature (T).

11. The method as claimed in claim 8, wherein the ambient conditions are determined by an ambient factor ($a_F$) calculated as a quotient of one and a square root of a product of an isentropic exponent (k), gas constant (R) and compressor inlet temperature (T) wherein (k) and (R) are approximated as a function of relative air humidity of inlet air.

12. The method as claimed in claim 8, wherein the ambient conditions are determined by an ambient factor ($a_F$) calculated as a quotient of one and a square root of a product of an isentropic exponent (k), gas constant (R) and compressor inlet temperature (T) wherein R is approximated as a function of a relative air humidity of inlet air.

13. The method as claimed in claim 8, wherein fuel mass flow is reduced during or after the closing of the variable compressor guide vanes during the underfrequency event of the grid.

\* \* \* \* \*